April 20, 1948. H. M. HOYT 2,440,091
BICYCLE
Filed May 13, 1944
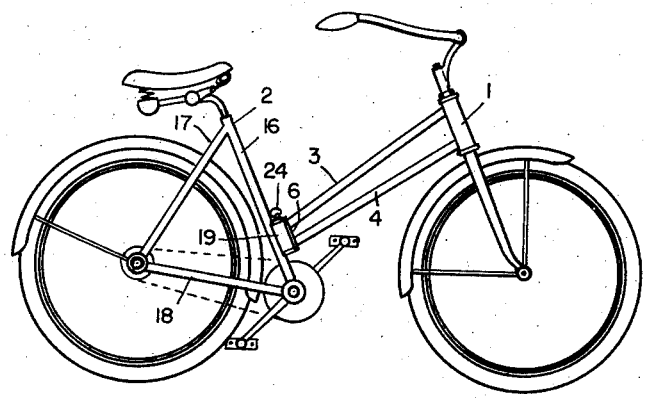
Fig. 1
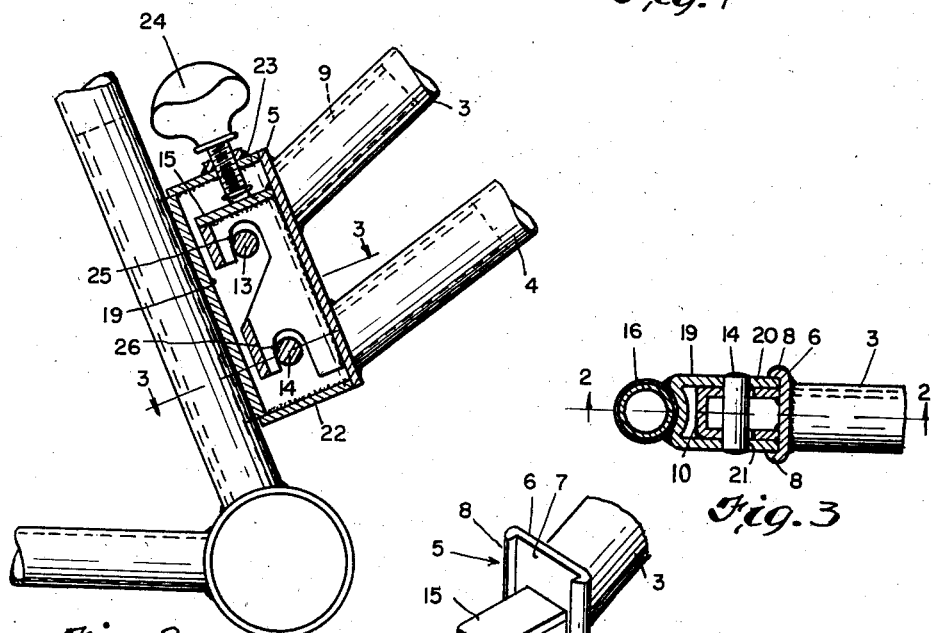
Fig. 2
Fig. 3
Fig. 4
INVENTOR.
HAROLD M. HOYT
BY
Oberlin, Limbach & Day
ATTORNEYS Patented Apr. 20, 1948

2,440,091

UNITED STATES PATENT OFFICE 2,440,091

BICYCLE

Harold M. Hoyt, Cleveland, Ohio, assignor to The Cleveland Welding Company, Cleveland, Ohio, a corporation of Ohio Application May 13, 1944, Serial No. 535,438

4 Claims. (Cl. 280—287)

1

This invention relates to bicycles and more particularly to bicycle frames formed of two separable parts provided with means whereby the two sections of the frame may be rigidly coupled together when the bicycle is in use.

It is a particular object of my invention to provide a structure of the character described which may be readily assembled and disassembled and which in its assembled form provides a structure fully as rigid as though the frame were a unitary structure.

Other objects of my invention will appear as the description proceeds:

To the accomplishment of the foregoing and related ends, said invention then comprises the features hereinafter fully described and particularly pointed out in the claims, the following description and the annexed drawing setting forth in detail an illustrative embodiment of the invention, this being indicative, however, of but one of the various ways in which the principle of the invention may be employed.

In said annexed drawing:

Fig. 1 is a side elevational view of a bicycle including one embodiment of my invention;

Fig. 2 is a fragmentary side elevational view partially in section of the complete frame shown in Fig. 1 drawn to an enlarged scale and showing one embodiment of my invention;

Fig. 3 is a transverse sectional view of the assembly illustrated in Fig. 2 taken on an offset plane generally indicated by the line 3—3; and Fig. 4 is a perspective view of one portion of the assembly illustrated in the previous figures.

Referring now more specifically to the drawing and more especially to Figure 1, the illustrated embodiment of my invention is shown associated with a front wheel supporting frame portion 1 and a rear wheel supporting frame portion 2. The front wheel portion 1 includes a pair of tubular frame members 3 and 4 which at their forward ends are connected in conventional fashion to the front fork head of the frame and at their opposite ends are provided with a bearing member generally indicated at 5.

The bearing member 5 as most clearly illustrated in Fig. 4 comprises a plate 6 having a substantially flat face 7 with marginal projections 8 along the opposite vertical edges. The plate 6 is attached by any suitable means such as welding to the ends of the bars 3 and 4. When a welded connection is thus employed, it may be necessary or desirable to place in the end of the tubular bars 3 and 4 an insert 9 which provides an increased wall thickness in the ends of the members 3 and 4, where they are welded to the plate 6.

To the face 7 of the plate 6 is secured as by welding a latch or hook member 10 which may be conveniently fabricated from a flat plate by bending it into U-shape and then welding the edges of the legs to the face 7 of the plate 6. The body of the member 10 is provided with cut-away portions 11 and 12 providing recesses to receive pins 13 and 14 respectively carried by the other frame portion in a manner hereinafter more particularly explained.

The bearing block or plate 15 is secured as by welding to the upper end of the member 10.

The rear wheel supporting frame portion 2 comprises a triangular frame made up of elements 16, 17 and 18 in accordance with conventional practice in the construction of bicycle frames.

The member 16 has welded thereto a U-shaped or U-section member 19 with the outer ends or edges of the legs or flanges 20 and 21 thereof arranged in a plane which is adapted to engage the face 7 of the member 6. The spacing of the legs 20 and 21 is such that they are snugly engaged by the ribs 8 on the member 6. In order to strengthen the assembly, a bottom plate 22 may be welded to the lower edges of the legs 20 and 21.

Secured in the opposite legs 20 and 21 of the U-shaped member 19 are spaced pins 13 and 14. These pins may be secured in the openings provided therefor either by welding or by peening over the ends or by any other suitable expedient.

Another plate 23 is welded across the upper edges of the legs 20 and 21 and such plate 20 is provided with a threaded opening in which is positioned a thumb screw 24.

The two sections of the bicycle frame may be rigidly coupled together by inserting the projection 10 into the opening between the legs 20 and 21 of the member 19 and it is then brought downwardly in such opening until the cut-away portions 11 and 12 embrace the pins 13 and 14. It will be observed that the lines 25 and 26 extend at an angle to the plane of the face 7 so that the cut-away portions 11 and 12 serve to wedge the face 7 against the ends of the legs 20 and 21.

Such wedging action by which the two parts are secured in rigid assembled relation may be accomplished either manually as the parts are brought into assembled relation, or such wedging action may be finally accomplished by means of the thumb screw 24. The primary purpose of the thumb screw 24, however, is to hold the parts in assembled relation as illustrated in Fig. 2.

From the foregoing description, it will be observed that I have provided a separable connection which, because of the extended bearing surfaces through which the stresses are transmitted, may be fully as strong as though the frame were an entire unitary structure.

Other modes of applying the principle of the invention may be employed, change being made as regards the details described providing the features stated in any of the following claims or the equivalent of such be employed.

I therefore particularly point out and distinctly claim as my invention:

1. A bicycle frame comprising a front wheel supporting frame portion, a rear wheel supporting frame portion and means for rigidly coupling said frame portions at upper and lower points comprising two sets of bearing members respectively carried by said frame portions and provided with complementary interengaging portions, one of said members being hollow box-like with top and bottom closure plates and the other member being received in said box-like member, and means associated with said top closure plate for holding said members in engagement.

2. A bicycle frame comprising a front wheel supporting frame portion, a rear wheel supporting frame portion and means for rigidly coupling said frame portions together including co-acting members respectively carried by said frame portion, one said member being hollow box-like having top and bottom closure plates and side plates with transverse pin locking means between, and the other said member being a hook member to enter said first member and engage said pin locking means, and means extending through said top closure plate to hold said hook member in engagement on said pin locking means.

3. A bicycle frame comprising a front wheel supporting frame portion, a rear wheel supporting frame portion and means for rigidly coupling said frame portions comprising bearing members respectively carried by said frame portions and provided with complementary faces extending transversely of the plane of the frame, one of said members being hollow box-like with top and bottom closure plates, and spaced-apart between said plates pins transverse to the frame, wedging tightening hook means on the other frame portion, and screw-threaded means through the top closure plate for locking said bearing members against uncoupling relative movement when said faces are thus in engagement.

4. A bicycle frame comprising a front wheel supporting frame portion, a rear wheel supporting frame portion and means for rigidly coupling said frame portions together including coacting members respectively carried by said frame portions, one said member being hollow box-like having top and bottom closure plates and side plates between which are upper and lower transverse pins, and the other said member including a plate on which is a projection to enter said box-like member and fit between its side plates and presenting overhanging hooks to wedgingly seat over said pins, and a screw extending through said top closure plate to bear on said other member.

HAROLD M. HOYT.

REFERENCES CITED

The following references are of record in the file of this patent:

UNITED STATES PATENTS

| Number | Name | Date |
|---|---|---|
| 768,295 | Palfrey | Aug. 23, 1904 |
| 1,434,441 | Koch | Nov. 7, 1922 |
| 2,211,164 | Rippenbein | Aug. 13, 1940 |
| 2,261,820 | Zimtbaum | Nov. 4, 1941 |

FOREIGN PATENTS

| Number | Country | Date |
|---|---|---|
| 30,805 | Sweden | Dec. 4, 1909 |
| 105,483 | Australia | May 17, 1938 |
| 706,657 | France | Mar. 31, 1931 |